Figure 11:
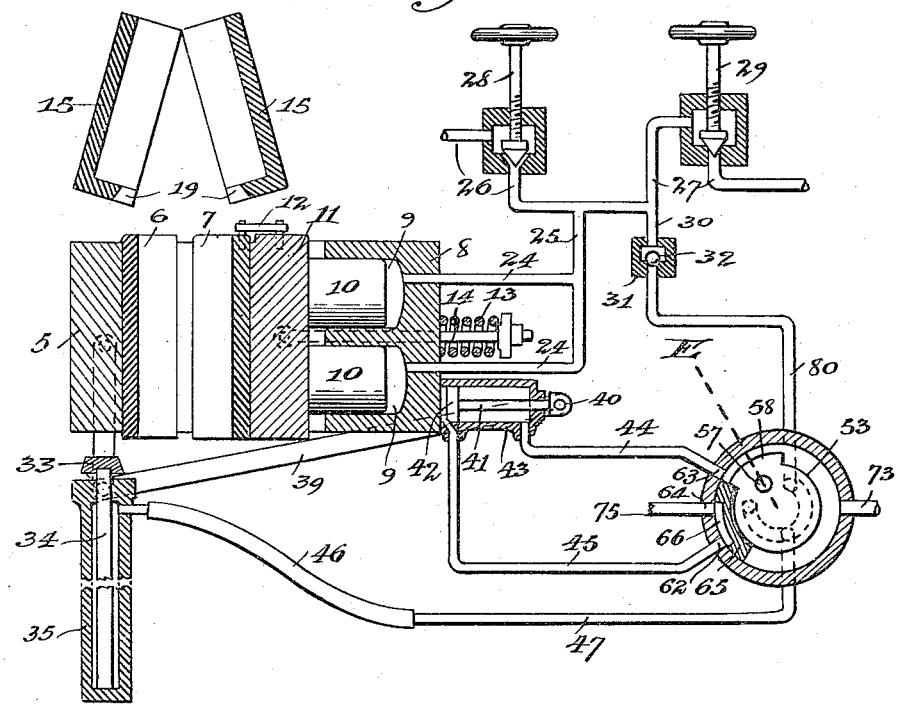

L. E. HOWARD.
FLUID PRESSURE DISTRIBUTION AND CONTROL SYSTEM.
APPLICATION FILED SEPT. 29, 1913.
1,124,443.
Patented Jan. 12, 1915.
5 SHEETS—SHEET 1.
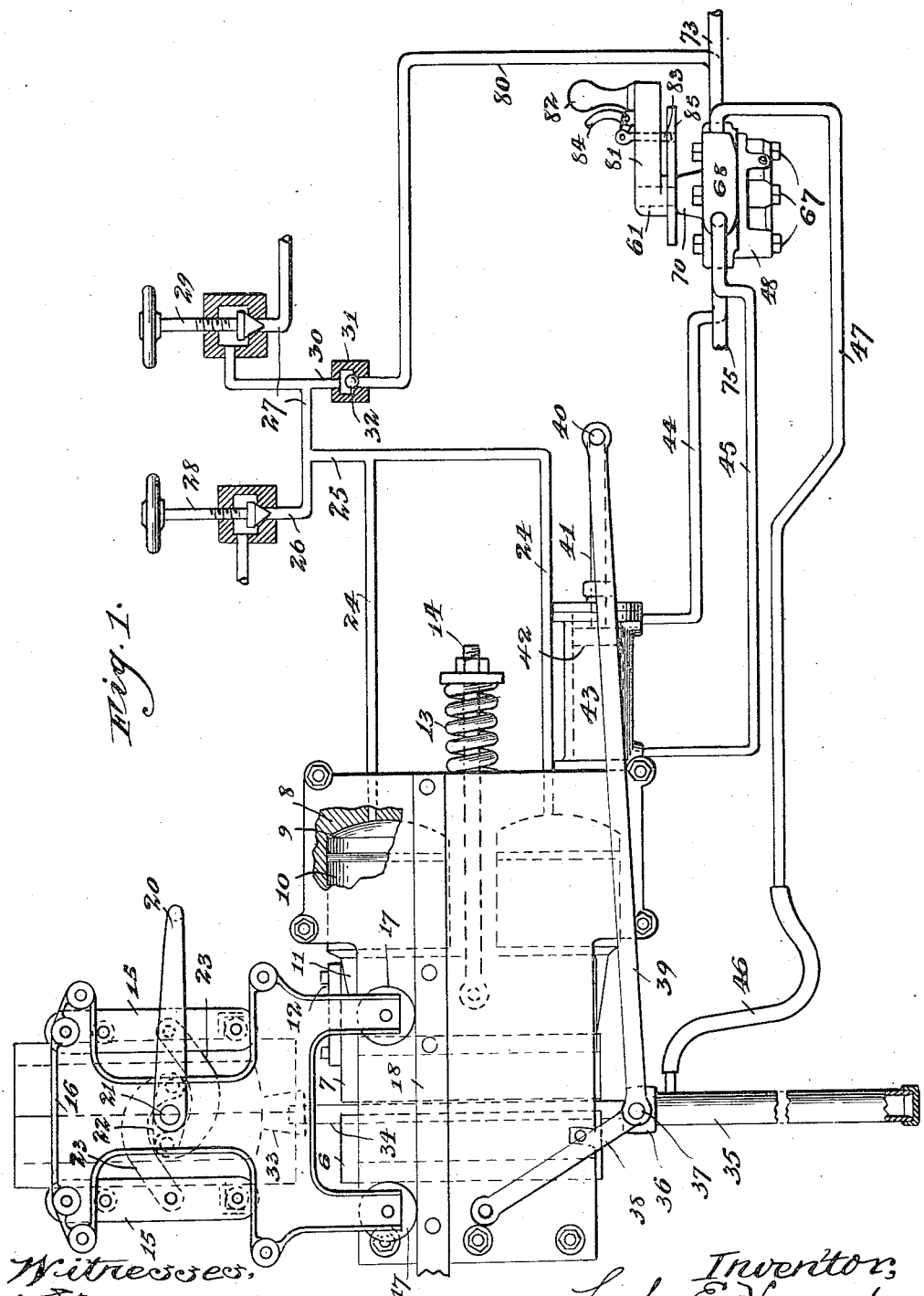

L. E. HOWARD.
FLUID PRESSURE DISTRIBUTION AND CONTROL SYSTEM.
APPLICATION FILED SEPT. 29, 1913.
1,124,443.
Patented Jan. 12, 1915.
5 SHEETS—SHEET 2.
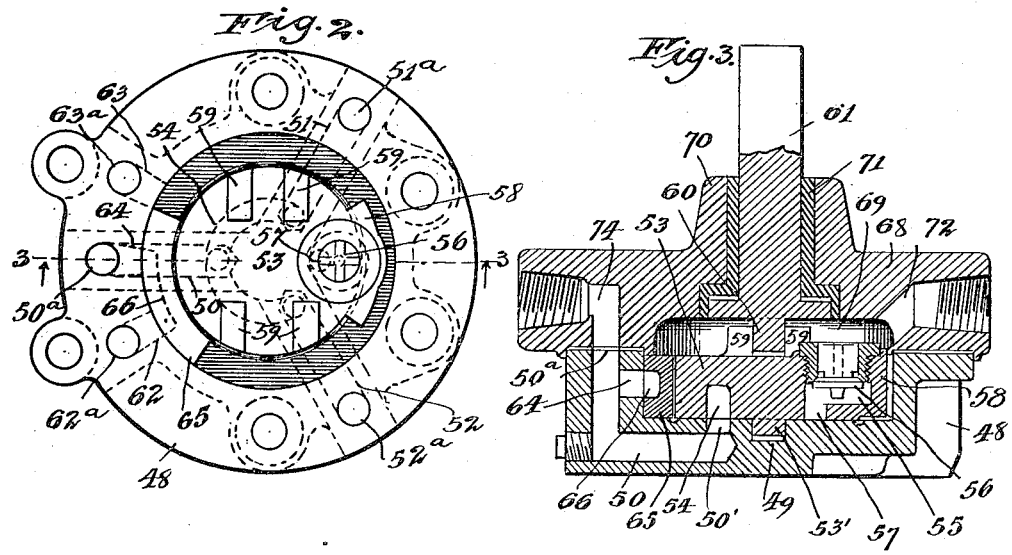
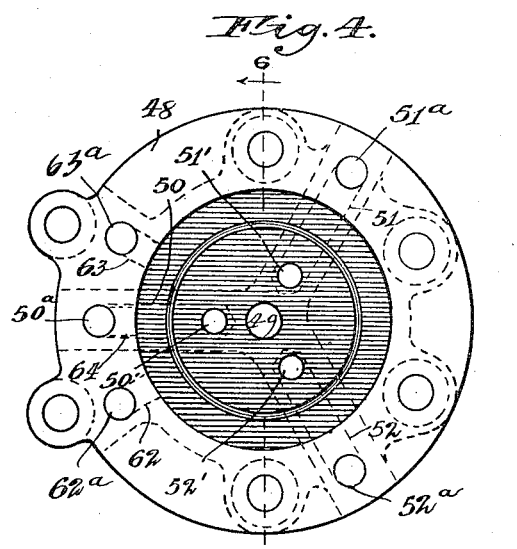
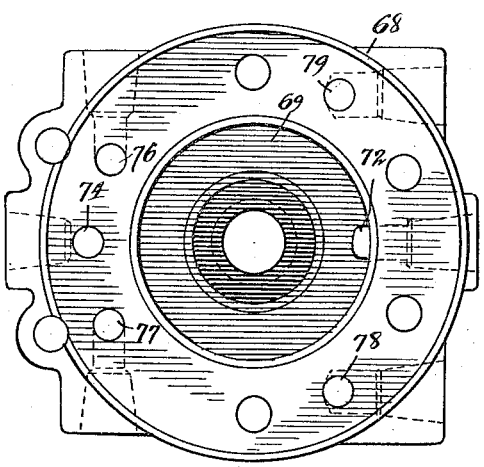
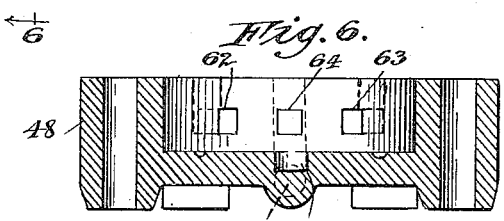
Witnesses,
Inventor,
Leslie E. Howard L. E. HOWARD.
FLUID PRESSURE DISTRIBUTION AND CONTROL SYSTEM.
APPLICATION FILED SEPT. 29, 1913.
1,124,443.
Patented Jan. 12, 1915.
5 SHEETS—SHEET 3.
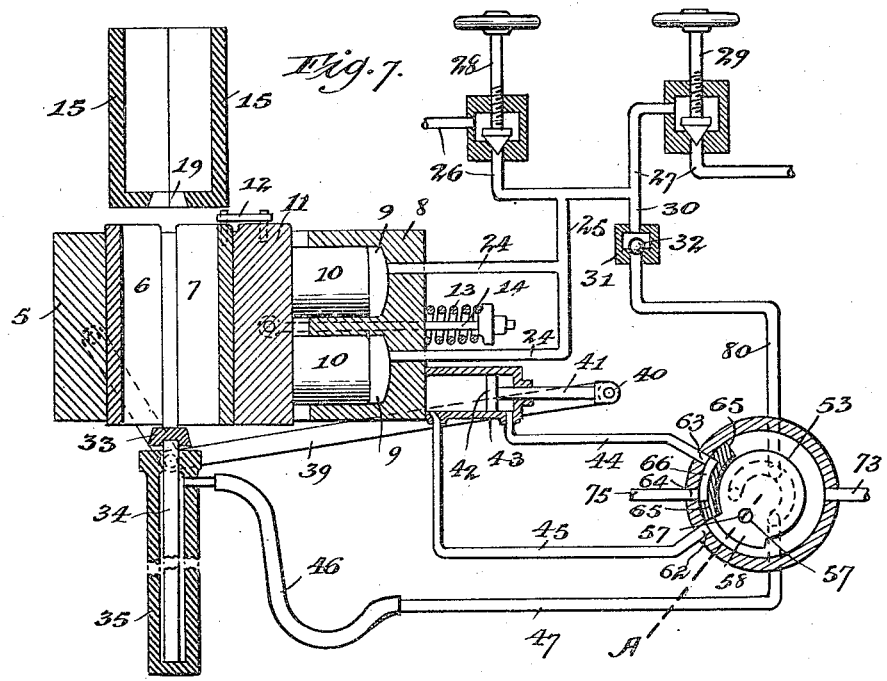
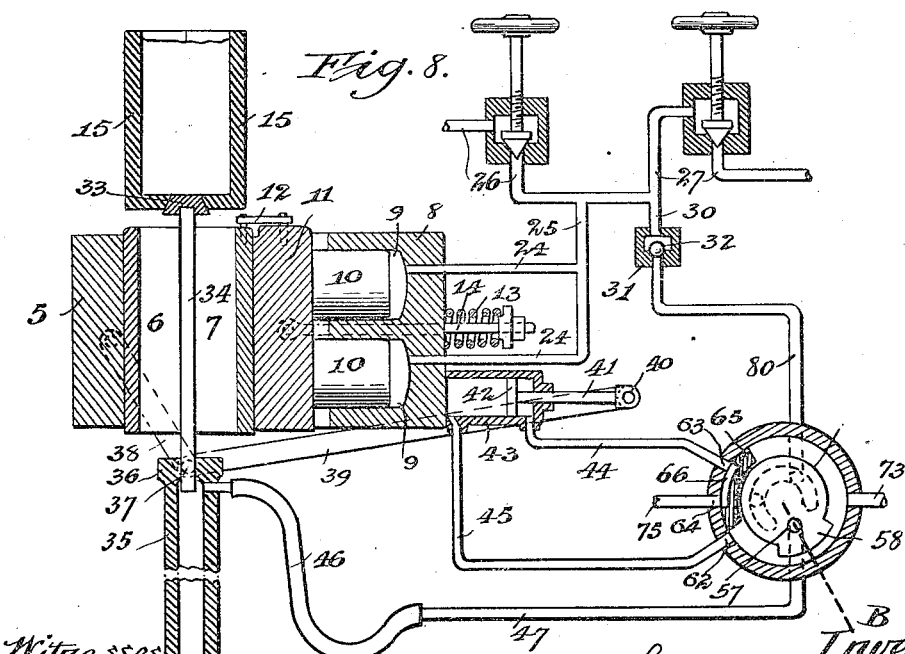

L. E. HOWARD.
FLUID PRESSURE DISTRIBUTION AND CONTROL SYSTEM.
APPLICATION FILED SEPT. 29, 1913.
1,124,443.
Patented Jan. 12, 1915.
5 SHEETS—SHEET 4.
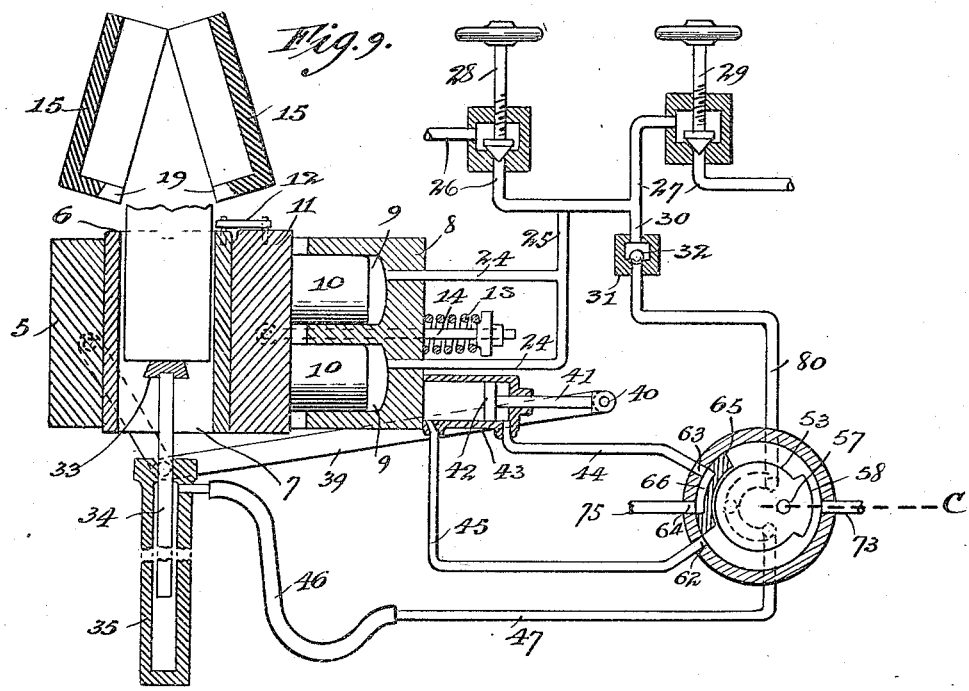
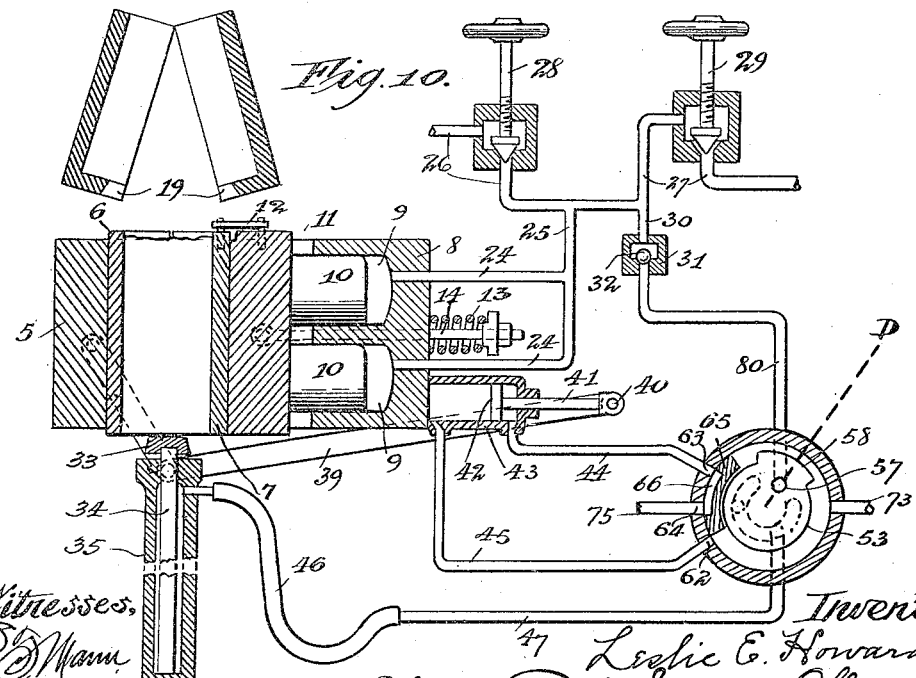

L. E. HOWARD.
FLUID PRESSURE DISTRIBUTION AND CONTROL SYSTEM.
APPLICATION FILED SEPT. 29, 1913.

1,124,443.

Patented Jan. 12, 1915.

UNITED STATES PATENT OFFICE.

LESLIE E. HOWARD, OF LOCKPORT, NEW YORK, ASSIGNOR TO SIMONDS MANUFACTURING COMPANY, OF FITCHBURG, MASSACHUSETTS, A CORPORATION OF MASSACHUSETTS.

FLUID-PRESSURE DISTRIBUTION AND CONTROL SYSTEM.

1,124,443.    Specification of Letters Patent.    Patented Jan. 12, 1915.

Application filed September 29, 1913. Serial No. 792,248.

*To all whom it may concern:*

Be it known that I, LESLIE E. HOWARD, a citizen of the United States, residing at Lockport, in the county of Niagara and State of New York, have invented certain new and useful Improvements in Fluid-Pressure Distribution and Control Systems, of which the following is a specification.

This invention relates to a new and improved system for effecting the distribution and control of fluid pressures employed for the operation of ingot-making machines of that type wherein the ingot is subjected, while its interior is still partially fluid, to a lateral compressive action to eliminate air bubbles and like defects at the core of the ingot.

My present system of fluid pressure distribution and control has been designed more particularly for application to and use in connection with such an ingot-making machine as is disclosed in Letters Patent No. 1,056,101, dated March 18, 1913, wherein the ingot is first cast in a mold above the compression die, then lowered from the mold into the die, and finally subjected to a lateral compressive action in the die.

The general object of the invention is to provide a simple and reliable means for controlling and distributing both the high and low pressure motive fluids that are employed in the operation of such a machine.

In order that the present invention may be clearly understood both as to its structure and mode of operation, I have illustrated the same herein in connection or association with the principal parts of the ingot casting and compression machine disclosed in my former Letters Patent above referred to.

Referring to the drawings, Figure 1 is a side elevation, with some details immaterial to the present disclosure omitted, of an ingot casting and compressing machine such as is shown in my Letters Patent above referred to, with my present fluid pressure distribution and control system applied thereto. Figs. 2 to 6 inclusive are detail views of the main distributing valve employed in the system; Fig. 2 being a top plan view of the valve-casing, main rotary valve, and auxiliary segment valve both in said valve-casing, with the casing cover and operating handle removed; Fig. 3 being a central vertical section through the valve-casing, its cover, and contained parts, including the central valve-stem, in the plane of the line 3—3 of Fig. 2; Fig. 4 being a top plan view similar to Fig. 2 of the body and valve-casing, with the main and auxiliary valves omitted therefrom, and more particularly illustrating the arrangement of ports and ducts in said valve-casing body; Fig. 5 being a bottom plan view of the cap or cover of the casing, with the valve-stem omitted; and Fig. 6 being a vertical section of the body member of the valve-casing taken on the line 6—6 of Fig. 4. Figs. 7, 8, 9, 10 and 11 are diagrammatic views illustrating different positions of the several valves of the system, including five different positions of the low pressure distribution valve, and the operations performed by the ingot casting and compressing machine under different positions or conditions of the fluid pressure distribution and control system.

Referring to the drawings, and first briefly describing the chief elements of the ingot casting and compressing machine therein illustrated, 5 designates the frame or casing of the die press that contains a stationary die-block 6 and a movable die-block 7. Laterally opposite the die-block 7 is a cylinder casting 8 forming one end member of the die-frame 5, and formed with a pair of cylinder chambers 9 therein. Slidably fitted within the cylinder chambers 9 are rams or plungers 10, the outer faces of which abut against a cross-head 11 that on its forward side abuts against the movable die-block 7, and is connected to the latter so as to retract the same and open the die by links 12. The plungers 10, cross-head 11, and movable die-member 7 are retracted automatically when the pressure is exhausted from the cylinders 9 by a spring 13 acting through a link 14 that extends through the cylinder casting 8 and is connected to the cross-head 11.

Directly above the die-press are a pair of mating mold sections 15 that are pivotally suspended at their upper ends on supporting frames 16, these latter in turn being mounted by wheels 17 on the track rails 18 secured to the opposite sides of the die-press frame 5. Through the bottom wall of the mold formed by the sections 15 is a conical opening 19, one-half of which is formed in the bottom wall of each section. The mold sections are swung between open and closed position by an actuating mechanism consisting of a handle 20, a rock-shaft 21 on which said handle is mounted, a rocking lever 22 fast on the shaft 21, and curved links 23 connecting the opposite ends of the rocking-lever 22 to the mold members 15.

During the operation of pouring the molten steel into the mold, the hole 19 in the bottom of the latter is closed by a tapered plug 33 mounted on the upper end of the plunger 34 of a fluid-pressure cylinder 35. The upper head 36 of the cylinder 35 is supported by trunnions 37 from a pair of pivoted links 38 mounted on opposite sides of the die-press frame 5. The trunnions 37 are also mounted in one end of a pair of approximately horizontal bars 39, the other end of said bars being connected to a crosshead 40 fast on the outer end of the rod 41 of a piston 42 that operates in a cylinder 43 secured to the outer face of the main cylinder casting 8.

Referring now to my improved system of fluid-pressure distribution and control for the several power cylinders 9, 35, and 43, 24 designates each of a pair of pipes that connect into the rear ends of the ram cylinders 9 and both communicate with a single pipe 25 which latter has two branches 26 and 27. The branch 26 constitutes an exhaust pipe for the cylinders 9 and is controlled by a hand-valve 28, while the branch 27 communicates with a source of high fluid pressure, and is controlled by a hand-valve 29. The high pressure supply-pipe 27 also has an extension 30 on the cylinder side of the hand-valve 29 that leads into a valve-box 31 containing a check-valve 32 for a purpose hereinafter described. Fluid pressure is alternately admitted to and exhausted from opposite sides of the piston 42 through pipes 44 and 45 that lead into the main low-pressure distribution valve hereinafter described; and fluid pressure is also admitted to and exhausted from the cylinder 35 through a flexible pipe or hose 46 connected to a pipe 47 that also communicates with the low-pressure distribution valve.

Referring now to the low-pressure distribution valve, which is shown in detail mainly in Figs. 2 to 6 inclusive, 48 designates the body of the valve casing, which is of a shallow cup-shape form having a central socket 49 in its bottom. In the bottom and side walls of the valve body 48 are three radially extending ducts 50, 51 and 52, disposed substantially 120 degrees apart. The inner ends of these ducts open upwardly through the upper surface of the bottom wall of the valve body through ports 50', 51' and 52', respectively. The outer ends of said ducts open through the upper surface of the circular side wall of the valve body through ports 50$^a$, 51$^a$, and 52$^a$, respectively. Seated within the cup-shape valve body 48 is the main rotary valve member 53, having a central depending pintle 53' fitted to the socket 49 for accurately positioning the valve 53 rotatably within the valve body. In the under face of the valve 53 is an arc-shaped groove 54 which, as best shown in Fig. 2, is of sufficient extent to overlie and connect all three of the ports 50', 51' and 52', when occupying the position shown in Fig. 2. There is also formed through the valve 53, centrally between the ends of the groove 54, a passage 55 controlled by a downwardly opening check-valve 56, and terminating at its lower end in a port 57 so positioned as to register with either of the ports 51' and 52', according to the position of the valve 53. On the side of the valve 53, opposite the passage 55, is formed a segmental extension 58; and on the upper surface of the valve 53 are two pairs of lugs 59 adapted to receive between them a tongue 60 on the lower end of a vertical handle-stem 61.

The body 48 of the valve casing is provided, in addition to the ducts and ports already mentioned, with two short rectangular ducts 62 and 63 lying on opposite sides of the duct 50, the upper ends of which form ports 62$^a$ and 63$^a$ (Fig. 2) in the top of the circular side wall of the valve casing 48, while their inner ends open into the chamber or space containing the rotary valve 53. There is also formed in this side wall of the valve casing body a port 64 (Fig. 3) which connects the chamber of the valve casing body with the vertical portion 50$^a$ of the duct 50.

The valve 53 is of a somewhat less diameter than the diameter of the chamber of the valve casing 48; and between the rotary valve 53 and the inner vertical wall of the casing 48 is slidably fitted an auxiliary segment valve 65 formed in its outer side with a groove or channel 66 of sufficient length to connect the port 64 with the inner ends of either of the ducts 62 and 63 lying on opposite sides of said port 64.

Surmounting the valve body 48 and clamped thereto in a fluid-tight manner by bolts 67 (Fig. 1) is the valve casing cover 68, shown in reverse plan in Fig. 5. It should be noted that since Fig. 4 is a plan view of the body while Fig. 5 is an under side view of the cover, when the cover shown in Fig. 5 is bolted to the body shown in Fig. 4, the position of the cover will be reversed from that shown in the said Fig. 5. This cover is hollowed out on its under side to form a chamber 69 overlying the rotary valve 53, and it is also formed with a central boss 70 having a countersunk bore fitted with a bushing 71 to receive the handle-stem 61. At one point in its periphery the cover 68 is formed with a fluid-pressure supply duct 72 that connects with a supply pipe 73 (Fig. 1) leading from a source of fluid (preferably water or oil) under relatively low pressure. The duct 72 communicates freely at its inner end with the chamber 69. At a point diametrically opposite the supply duct 72 is an exhaust duct 74 that communicates with an exhaust pipe 75 (Fig. 1); the lower end of the exhaust duct 74 registering with the port 50ᵃ of the radial duct 50. In the cover 68 are also formed four other ducts 76, 77, 78 and 79 (Fig. 5), the inner ends of which open through the lower annular side of the cover 68.

In the assembled position of the parts described, the following ducts of the valve casing body and cover are in permanent registry with each other; 50ᵃ and 74, 62ᵃ and 76, 63ᵃ and 77, 51ᵃ and 78, and 52ᵃ and 79. The outer end of duct 76 communicates with the pipe 45; the outer end of duct 77 communicates with the pipe 44; the outer end of duct 79 communicates with the pipe 47; while the outer end of duct 78 communicates with a pipe 80 that leads into the check-valve casing 31.

On the upper end of the stem 61 is an arm 81 (Fig. 1) equipped with a handle 82 and a locking dog 83 actuated by a handle clamp 84 and engaging a segment plate 85 for locking the operating arm 81 in any of five different positions.

The described valve mechanism in operation controls the several cylinders of the ingot casting and compressing machine to which it is herein shown as applied in the following manner: Referring more particularly to Figs. 7 to 11 inclusive, in the initial or starting position, the valve handle 81 is set in the A position indicated by a radial dotted line in Fig. 7, in which position the segment lug 58 engages one end of the auxiliary segment valve 65 and moves it to the position shown in Fig. 7. This at the same time places the rotary valve 53 in such a position that the water or other fluid under pressure entering through pipe 73 and passage 72 floods the valve chamber 69 and the space surrounding the valve 53, and the position of the latter valve allows water to flow through registering ducts 62 and 76 and pipe 45 into the inner end of cylinder 43, which, through the medium of piston 42, piston rod 41, cross-head 40, links 39 and 38, and trunnions 37 shifts the cylinder 35 to the position shown in Fig. 7 wherein its axis is approximately in alinement with the axes of the superposed die and mold. If the mold has not been previously closed, it is now closed by depressing the handle 20.

The low-pressure distribution valve handle is now swung from the A position (Fig. 7) to the dotted line position indicated by B in Fig. 8, whereupon the fluid under pressure entering the valve chamber 69 through the duct 72 passes past check-valve 56 and through port 57 in the rotary valve and thence through duct 52 (with the port 52′ of which the port 57 at this time communicates), port 52ᵃ, and duct 79 of the cover into and through pipes 47 and 46 and into cylinder 35, raising the ram 34 and closure plug 33, the latter making a substantially tight joint with the bottom of the mold members 15. Molten steel or other material to be treated is now poured from any suitable container or pouring device into the mold and allowed to stand undisturbed long enough to allow an envelop of solid material to form around its sides and bottom.

The low-pressure distribution valve handle is next swung to the dotted line position indicated by C in Fig. 9, in which position the port 57 of the rotary valve is blanked. The arc-shaped channel 54 of the disk valve 53 is now in such a position as to establish communication between port 52′ (communicating with pipe 47) and port 50′ (communicating with exhaust pipe 75), thus allowing pressure to escape from cylinder 35 through hose 46, pipe 47, duct 79, duct 52, channel 54, duct 50, duct 74, and exhaust pipe 75. The pressure having thus been removed from cylinder 35, the weight of the cast ingot resting on plug 33 causes the ram 34 to descend until the bottom of the ingot is substantially in a horizontal plane with the bottom of the press dies 6 and 7.

The low-pressure distribution valve handle is next swung to the dotted line position D shown in Fig. 10, in which position the port 57 of the disk valve 53 registers with the valve seat port 51′, allowing fluid-pressure to flow through port 51′, duct 51, port 51ᵃ, duct 78, pipe 80, check-valve casing 31, pipes 30, 27, 25 and 24 into the high-pressure cylinders 9, causing the rams 10 to move forward carrying with them the cross-head 11 and movable die member 7; at which time both the manually operated high-pressure supply and discharge valves 29 and 28 are in the closed position shown in Figs. 1 and 9. This pressure, however, is not sufficient to cause any compressing action upon the ingot, and is simply to conserve the high pressure hydraulic supply subsequently admitted by the valve 29.

As soon as the die member 7 comes in contact with the ingot being treated and this in turn has been forced into contact with die member 6 so that there is no further movement of die member 7, cross-head and high-pressure rams, the high-pressure controlling valve 29 is opened slightly, allowing fluid under high pressure to flow from supply pipe 27 past valve 29 and through pipes 25 and 24 into the cylinders 9, thus causing a further and compressing movement of the high-pressure rams 10, whereby the desired squeezing or compressing effect upon the partially cooled ingot is secured. When this high-fluid pressure is thus admitted to the cylinders 9, the check-valve 32 obviously prevents the flow of the high-pressure medium through pipe 80 into the low-pressure distribution valve. During this operation of compressing the ingot, and after the pressure is great enough so that the ingot will not fall through the die by gravity if unsupported, the handle of the distribution valve is finally swung to the dotted line position E, Fig. 11, during which movement the segment lug 58 of the disk valve strikes the other end of the segment valve 65, shifting the latter from the position shown in Figs. 7, 8, 9, and 10 to the position shown in Fig. 11. This blanks the port 57 of the disk valve 53, and places the pipe 45 in communication with exhaust pipe 75 through duct 76, duct 62, duct 66 of the segment valve 65, port 64, duct 50, and exhaust duct 74, thereby freeing the pressure on the inner face of piston 42. At the same time the fluid-pressure medium supplied by pipe 73 and surrounding the disk valve 53 flows through ducts 63 and 77, and pipe 44 into the outer end of cylinder 43, thus, through the described connections, returning the ingot-lowering cylinder and its ram to the initial or starting point shown in Fig. 11, out of the way of the subsequent delivery of the compressed ingot through the bottom of the press.

During the operation of pressing the ingot, the high-pressure discharge valve 28 is, of course, closed. When the compressing operation has proceeded to a satisfactory conclusion, the high-pressure supply valve 29 is closed and the high-pressure discharge valve 28 is opened, as shown in Fig. 11, thus allowing the cross-head to be retracted by the spring 13, carrying with it the die member 7 and rams 10, and discharging the hydraulic fluid in the cylinders 9 through pipes 24, 25 and 26.

From the foregoing it will be noted that my invention provides an easily and simply operated system of pipes and valves for effecting and controlling the distribution of the requisite high and low-pressure motive fluids in proper sequence to a plurality of power cylinders employed in connection with an ingot press.

It will also be noted that the several operations which govern the distribution and control of the low-pressure fluid are brought about by successive movements of a single valve-handle in the same direction, which simplifies the mode of manipulating the valve and reduces the liability of error in such manipulation.

I claim—

1. The combination with an ingot casting and compression machine having a high pressure cylinder and a plurality of low pressure cylinders, of a distribution valve, low pressure supply and exhaust pipes connected to said distribution valve, pipes leading from said distribution valve to said low pressure cylinders, said distribution valve serving to admit and exhaust motive fluid to and from said low pressure cylinders successively, a high pressure supply pipe communicating with said high pressure cylinder, and a manually operated valve in said high pressure supply pipe.

2. The combination with an ingot casting and compression machine having a high pressure cylinder and a plurality of low pressure cylinders, of a distribution valve, low pressure supply and exhaust pipes connected to said distribution valve, pipes leading from said distribution valve to said low pressure cylinders, said distribution valve serving to admit and exhaust motive fluid to and from said low pressure cylinders successively, a combined supply and exhaust pipe communicating with said high pressure cylinder, high pressure supply and exhaust pipes communicating with said combined supply and exhaust pipe, and manually operated valves in said high pressure supply and exhaust pipes, respectively.

3. The combination with an ingot casting and compression machine having a high pressure cylinder and a plurality of low pressure cylinders, of a distribution valve, low pressure supply and exhaust pipes connected to said distribution valve, pipes leading from said distribution valve to said low pressure cylinders, said distribution valve serving to admit and exhaust motive fluid to and from said low pressure cylinders, successively, a high pressure supply pipe communicating with said high pressure cylinder, a manually operated valve in said high pressure supply pipe, and a pipe connecting said distribution valve with said high pressure supply pipe on the cylinder side of said manually operated valve for preliminarily admitting low pressure through said distribution valve to said high pressure cylinder.

4. The combination with an ingot casting and compression machine having a high pressure cylinder and a plurality of low pressure cylinders, of a distribution valve, low pressure supply and exhaust pipes connected to said distribution valve, pipes leading from said distribution valve to said low pressure cylinders, said distribution valve serving to admit and exhaust motive fluid to and from said low pressure cylinders, successively, a combined supply and exhaust pipe communicating with said high pressure cylinder, high pressure supply and exhaust pipes communicating with said combined supply and exhaust pipe, manually operated valves in said high pressure supply and exhaust pipes, respectively, a pipe leading from said distribution valve and communicating with said combined supply and exhaust pipe for preliminarily admitting low pressure through said distribution valve to said high pressure cylinder, and a check valve in said last named pipe.

5. In ingot-making apparatus, the combination of a high pressure cylinder, a low pressure cylinder, a distribution valve, low pressure supply pipes connecting said valve with said cylinders, a high pressure valve adapted to admit high pressure fluid to said high pressure cylinder, an exhaust pipe connected to said distribution valve, said distribution valve serving to admit and exhaust motive fluid to said cylinders and to exhaust from said low pressure cylinder, and a valve interposed between said distribution valve and said high pressure cylinder.

6. In ingot-making apparatus, the combination of a high pressure cylinder, a low pressure cylinder, a distribution valve, pipes connecting said valve with said cylinders, a pipe connected to said distribution valve adapted to admit low pressure motive fluid to the same, an exhaust pipe connected to said distribution valve adapted to exhaust said motive fluid from the valve, said valve being adapted to admit low pressure motive fluid to both of said cylinders, and means for admitting high pressure fluid to said high pressure cylinder.

7. The combination of an ingot-making apparatus having a high pressure cylinder and a plurality of low pressure cylinders, a distribution valve, low pressure supply and exhaust pipes connected to said distribution valve, pipes leading from said valve to said low pressure and said high pressure cylinders, said distribution valve serving to admit and exhaust motive fluid to and from said low pressure cylinders successively, and a valve adapted to admit high pressure motive fluid to said high pressure cylinder.

8. The combination of an ingot-making apparatus having a high pressure cylinder and a plurality of low pressure cylinders, a distribution valve, low pressure supply and exhaust pipes connected to said distribution valve, pipes leading from said valve to said low pressure and said high pressure cylinders, said distribution valve serving to admit and exhaust motive fluid to and from said low pressure cylinders successively, a valve adapted to admit high pressure motive fluid to said high pressure cylinder, and a check valve interposed in the pipe connecting said distribution valve with said high pressure cylinder.

LESLIE E. HOWARD.

Witnesses:
WILLIAM C. CARTER,
J. G. TABER.

Copies of this patent may be obtained for five cents each, by addressing the "Commissioner of Patents, Washington, D. C."